C. H. WESTON & J. DENNIS.

Cloth-Presses.

No. 5,743. Reissued Jan. 27, 1874.

WITNESSES.
Franck L. Durand
C. L. Everh.

INVENTOR
Chas. H. Weston,
John Dennis,
Alexander Hudson
Attorneys.

By

AM. PHOTO-LITHOGRAPHIC Co. N.Y. (OSBORNE'S PROCESS)

UNITED STATES PATENT OFFICE.

CHARLES H. WESTON AND JOHN DENNIS, OF LOWELL, MASSACHUSETTS.

IMPROVEMENT IN CLOTH-PRESSES.

Specification forming part of Letters Patent No. 103,262, dated May 17, 1870; reissue No. 5,743, dated January 27, 1874; application filed December 11, 1873.

*To all whom it may concern:*

Be it known that we, CHARLES H. WESTON and JOHN DENNIS, of Lowell, in the county of Middlesex and State of Massachusetts, have invented certain new and useful Improvements in Cloth-Presses; and we do hereby declare that the following is a full, clear, and exact description thereof, that will enable others skilled in the art to which it appertains to make and use the same, reference being had to the accompanying drawings and to the letters of reference marked thereon, which form a part of this specification.

Our invention relates to that class of presses known as steam cloth-presses; and consists in the construction and arrangement of the parts thereof, as will be more fully hereinafter described.

In order to enable others skilled in the art to which our invention appertains to make and use the same, we will now proceed to describe its construction and operation, referring to the annexed drawing, in which—

Figure 1:
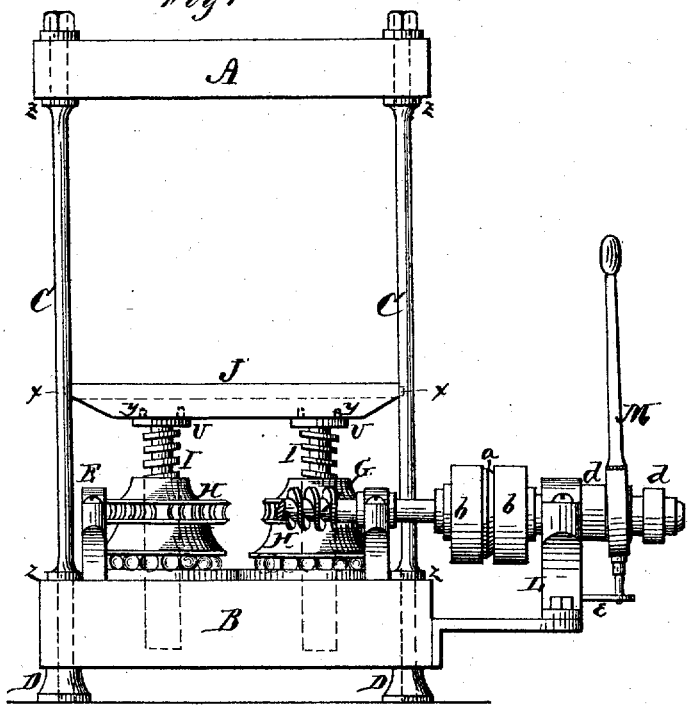
Figure 2:
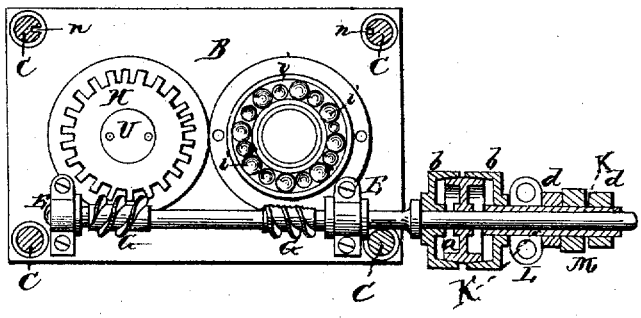

Figure 1 is a side elevation, and Fig. 2 a horizontal section, of a steam cloth-press embodying our invention.

In the accompanying drawings, we have not deemed it necessary to represent any more of a steam cloth-press than what is requisite for a full understanding of the case.

A represents the top, and B the bottom or base, of the press, connected by means of four corner-posts, C C, provided with shoulders *z z* near their ends, against which the top and bottom rest, they being secured by nuts, the nuts D D, under the bottom, forming the feet, upon which the press rests; or, in place of the nut, it may be a welded collar, combined with a foot. Two of the posts C C are provided with longitudinal grooves *n n*, as seen in Fig. 2, in which grooves lugs or projections *x* on the plates fit, so as to guide them in their upward and downward movements. In two small standards, E E, on the base B, a horizontal worm-shaft, G, has its bearings, said worms gearing with two cog-wheels, H H, provided with female screws in the center, through which pass the vertical screws I I, supporting the lower plate, J, so that, by turning the worm-shaft in either direction, said plate is either raised or lowered. On the shaft G, outside of the press, is placed a sleeve, K, which passes through a standard, L, attached in any suitable manner to the side of the base B, forming the bearing for the same. This sleeve is, on its inner end, provided with a pulley, *a*, the outer circumference of which is beveled, as shown in Fig. 2, from the center inward toward the edges. On each side of the pulley *a* is placed a loose pulley, *b*—one on the shaft G, and the other on the sleeve K. These pulleys *b b* are hollow on the sides facing the pulley *a*, so that they can inclose the edge of said pulley, and bear tightly against the same. On the sleeve K, outside of the standard L, are secured two collars, *d d*, a suitable distance apart, between which collars a loose lever, M, is placed, the lower end of said lever being pivoted in an arm, *e*, extending from the standard L. By the use of this lever the sleeve K may be moved so as to bring the pulley *a* in contact with either one of the pulleys *b*, said pulleys being connected with the engine—one by a straight or open and the other by a cross belt—so that the worm-shaft can readily be moved or turned in either direction to raise or lower the plates. The sleeve K is provided, on its inside, with a feather, which fits in a longitudinal groove on the shaft, and thus the sleeve may be moved endwise on the shaft, but cannot revolve without also revolving the shaft. In the base B of the press are two ball-boxes, provided with circular recesses, in which are placed a series of balls, *i i*, upon which the worm-wheels H H rest, said wheels being constructed, substantially in the form shown, around castings, which form caps or covering-plates for the balls. The balls *i i* are of two sizes, being placed, alternately, a large and a small ball, which makes less friction than there would be if the balls were all of one size, as it will readily be seen that by having every other ball smaller it rolls, and does not rub, as it would if all were of one size. We may, however, use balls all of one size, as well as cones instead of the balls, which would answer the same purpose. The balls may be placed either inside or outside of the ball-box. At the upper end of each screw I is a swiveled disk, U, with pins projecting from its upper side into sockets *y y* in the under side of the plate J.

Having thus fully described our invention, what we claim as new, and desire to secure by Letters Patent, is—

1. The combination of the grooved standards C C, plate J provided with the lugs *x* and sockets *y*, the disks U U provided with pins, and the screws I I, all constructed substantially as and for the purposes herein set forth.

2. The combination of the screws I I, caps or plates H H provided with exterior cogs and interior screw-threads, gear-balls *i i*, and worm G, all constructed substantially as and for the purposes herein set forth.

In testimony that we claim the foregoing we have hereunto set our hands this 15th day of November, 1873.

CHAS. H. WESTON.
JOHN DENNIS.

Witnesses:
J. LADD,
JAMES M. BATTLES.